United States Patent [19]

Famiglietti et al.

[11] Patent Number: 4,990,120
[45] Date of Patent: Feb. 5, 1991

[54] PEANUT PEOPLE

[76] Inventors: Arthur Famiglietti, P.O. Box 94, Corfu, N.Y. 14036; George Spector, 233 Broadway, #3815, New York, N.Y. 10007

[21] Appl. No.: 503,060

[22] Filed: Apr. 2, 1990

[51] Int. Cl.⁵ .................. A63H 3/36; A23G 1/00; A01N 1/00; A01N 3/00
[52] U.S. Cl. .................. 446/386; 446/390; 426/104; 428/16; 428/17
[58] Field of Search .............. 446/386, 390, 373, 374, 446/375, 376, 382, 385, 370; 426/104; 428/15, 16, 17

[56] References Cited

U.S. PATENT DOCUMENTS

| | | | |
|---|---|---|---|
| 854,224 | 5/1907 | Lamprey | 446/386 |
| 1,409,411 | 3/1922 | Rogers | 446/374 |
| 1,591,661 | 7/1926 | Dinsdale | 446/374 |
| 2,209,791 | 7/1940 | Norriss | 446/374 |
| 4,136,484 | 1/1979 | Abrams | 446/370 |
| 4,333,974 | 6/1982 | Davis | 446/386 X |

FOREIGN PATENT DOCUMENTS

| | | | |
|---|---|---|---|
| 140809 | 9/1920 | United Kingdom | 446/374 |
| 418713 | 10/1934 | United Kingdom | 446/374 |
| 1414741 | 11/1975 | United Kingdom | 446/376 |
| 1585330 | 2/1981 | United Kingdom | 446/376 |
| 2197800 | 6/1988 | United Kingdom | 446/370 |

Primary Examiner—Robert A. Hafer
Assistant Examiner—D. Neal Muir

[57] ABSTRACT

A peanut person is provided in which the head and body are made from peanuts, the arms and legs are made of insulated wire, the hands from electric connectors and the feet from plastic material.

4 Claims, 1 Drawing Sheet

PEANUT PEOPLE

BACKGROUND OF THE INVENTION

The instant invention relates generally to dolls and more specifically it relates to a peanut person.

There are available conventional dolls of various designs but which do not provide the novel improved functions and structure of the invention herein disclosed.

SUMMARY OF THE INVENTION

A primary object of the present invention is to provide a peanut person that will overcome the shortcomings of the prior art devices.

Another object is to provide a peanut person in which the head and body of the person is made from peanuts, while the arms and legs of made of insulated wire.

An additional object is to provide a peanut person in which the arm and hand can be rotatable with respect to the body.

A further object is to provide a peanut person that is simple and easy to use.

A still further object is to provide a peanut person that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
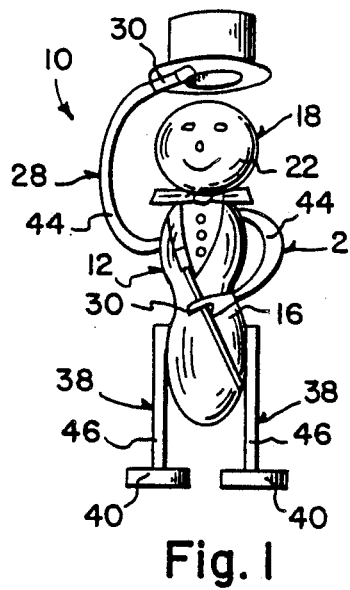
FIGS. 1, 2 and 3 are front elevational views of three different types of peanut people utilizing the configuration of the invention.
Figure 2:
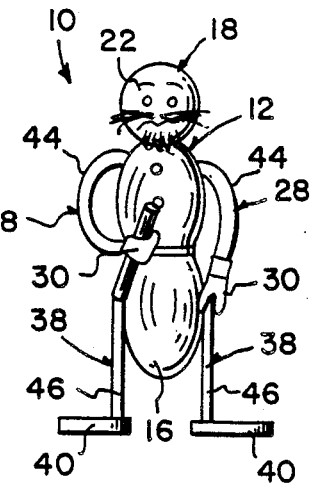
Figure 3:
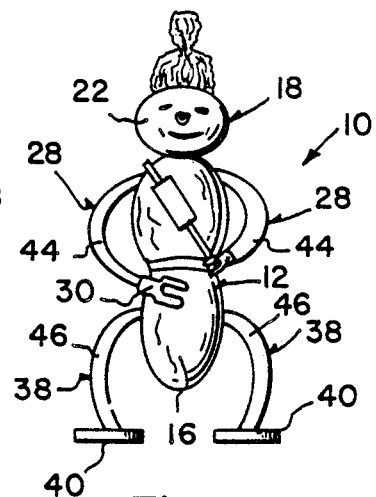

Turning now descriptively to the drawings, in which similar reference characters denote similar elements throughout the several views, FIGS. 1 through 4 illustrate a peanut person 10 consisting of a body 12 made of a double peanut 14 in a shell 16. A head 18 made of a single peanut 20 in a shell 22. A wire post 24 is for securing the peanut head 18 to the peanut body 12. A wire 26 extends through each side of upper portion of the peanut body 12 to form two arms 28. An electric connector 30 is attached to end of each arm 28 to form a hand. A pair of Z-shaped wires 32 are provided. Each wire 32 is connected at upper bent end 34 to one side of the lower portion of the peanut body 12 so that middle segment 36 will form a leg 38. A plastic plate 40 is folded and affixed to lower bent end 42 of each Z-shaped wire 32 to form a foot. A plastic sleeve 44 covers each arm 28 while a plastic sleeve 46 covers each leg 38.

Figure 4:
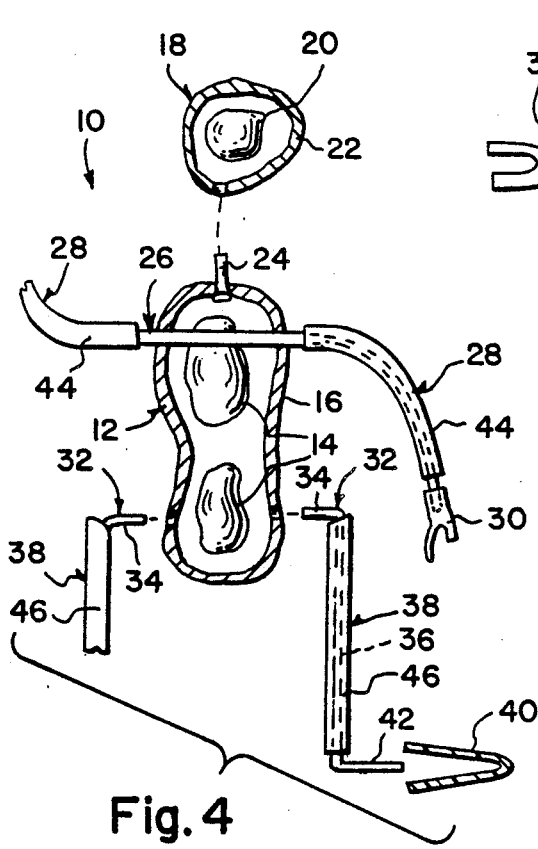
FIG. 4 is a view partly exploded and in cross section showing how the various parts of the peanut people of FIGS. 1, 2 and 3 are constructed.

The wire 26 extending through each side of the upper portion of the peanut body 12 that forms the two arms 28 is a single elongated wire going through the upper portion of the peanut body 12 as best seen in FIG. 4.

Figure 5:
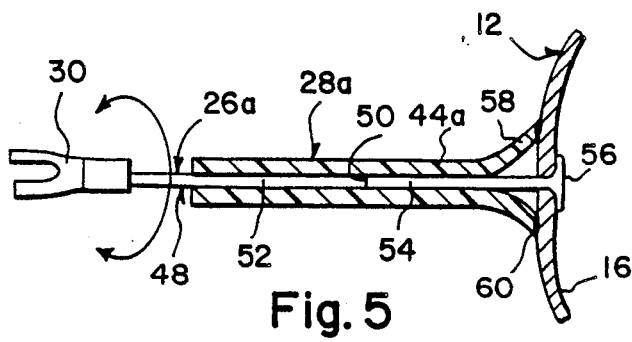
FIG. 5 is a cross sectional view of a modification showing a rotational hand and arm affixed to the peanut body.

A modification is shown in FIG. 5 in which the wire 26a extending through each side of the upper portion of the peanut body 12 that forms the two arms 28a is two separate identical wire arms 48. One of the wire arms 48 is illustrated and is transversely cut midway at 50 into two parts 52 and 54 and terminates at the peanut body 12 with a stationary securing portion 56. The sleeve 44a has a flared end 58 connected with adhesive 60 to the peanut body 12 so that front part 52 of the wire arm 48 can rotate with the respective electric connector hand 30 allowing the arm 28a to be bent and hand 30 placed in various positions.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A peanut person comprising:
   (a) a body made of a double peanut in a shell;
   (b) a head made of a single peanut in a shell;
   (c) a wire post for securing said peanut head to said peanut body;
   (d) a wire extending through each side of upper portion of said peanut body to form the arms;
   (e) a pair of electric connectors, each attached to one end of one of the arms to form one hand;
   (f) a pair of Z-shaped wires, each connected at upper bent end to one side of lower portion of said peanut body so that middle segment will form a leg; and
   (g) a pair of plastic plates, each folded and affixed to lower bent end of one said Z-shaped wires to form a foot.

2. A peanut person as recited in claim 1, further including:
   (a) a first pair of plastic sleeves, each covering one of the arms; and
   (b) a second pair of plastic sleeves, each covering one of the legs.

3. A peanut person as recited in claim 2, wherein said wire extending through each side of the upper portion of said peanut body that forms the two arms is a single elongated wire going through the upper portion of said peanut body.

4. A peanut person as recited in claim 2, further includes:
   (a) said wire extending through each side of the upper portion of said peanut body that forms the two arms is two separate identical wire arms in which each said wire arm is transversely cut midway into two parts and terminates at said peanut body with a stationary securing portion; and
   (b) each of said first pair of plastic sleeves having a flared end connected to said peanut body so that front part of the wire arm can rotate with said respective electric connector hand allowing said arm to be bent and said hand placed in various positions.

* * * * *